United States Patent [19]  [11] 4,080,998
Mottola et al.  [45] Mar. 28, 1978

[54] IMPACT ENERGY ABSORBING PIPE RESTRAINTS

[75] Inventors: Elia A. Mottola, North Andover; George H. East, Jr., Randolph; Norman A. Goldstein, Framingham; Wu-Cheng Huang, North Reading; John M. Peech, Cambridge; Shelden D. Pirotin, Melrose; Robert E. Roemer, Brighton; Albert J. Spada, Wilmington, all of Mass.

[73] Assignee: Stone & Webster Engineering Corporation, Boston, Mass.

[21] Appl. No.: 703,123

[22] Filed: Jul. 7, 1976

[51] Int. Cl.$^2$ .............................................. F16L 3/04
[52] U.S. Cl. .................................. 138/107; 138/149; 248/54 R; 248/49; 122/510; 267/136
[58] Field of Search ................... 248/49, 54 R, 54 CS, 248/68 CB, 114 B; 61/113; 52/86; 138/106, 107, 172, 103; 267/136; 122/510

[56] References Cited

U.S. PATENT DOCUMENTS

| 2,280,349 | 4/1942 | Palm | 248/54 D |
| 2,987,991 | 10/1976 | Keejer et al. | 248/49 |
| 3,965,938 | 7/1976 | Bauerle et al. | 248/54 R |

*Primary Examiner*—James B. Marbert
*Attorney, Agent, or Firm*—Morgan, Finnegan, Pine, Foley & Lee

[57] ABSTRACT

Impact energy absorbing pipe restraints are provided which include a laminated strap for surrounding at least a portion of the circumference of a high energy pipe to restrain the movement of the high energy pipe in at least one direction during rupture. The laminated strap is formed of a ductile material, i.e., one having the property of substantial elongation in the plastic state, to absorb the impact energy of the ruptured pipe. Advantageously, an elastic anchor means is affixed to the ends of the laminated strap to anchor the laminated strap about the high energy pipe and enable pivotal movement of the laminated strap relative to the high energy pipe to minimize any bending moment at the ends of the laminated strap, thereby minimizing any detraction in the allowable strain of the laminated strap. Another form of impact energy absorbing restraint device includes a pipe positioned adjacent the high energy pipe and arranged substantially transverse to the longitudinal axis thereof to restrain the movement of the high energy pipe in at least one direction by absorbing the impact energy of the high energy pipe during rupture by crushing of the restraining pipe therewith. Advantageously, crushing of the restraining pipe causes the ends of the restraining pipe to move upward so that in effect a well is formed by the restraining pipe which aids in the absorption of energy and restricts lateral movement of the ruptured high energy pipe.

7 Claims, 6 Drawing Figures

IMPACT ENERGY ABSORBING PIPE RESTRAINTS

CROSS REFERENCE TO RELATED APPLICATIONS

This application is related to application Ser. No. 703,230 also filed on July 7, 1976 and to application Ser. No. 703,229 filed on July 7, 1976.

FIELD OF THE INVENTION

The present invention relates to restraints for ruptured pipes and more specifically to inelastic or plastic restraining devices for absorbing the impact energy of a ruptured pipe to restrain its movement in at least one direction. The present invention has particular application for use with high energy pipes or pipelines of any diameter which transmit pressurized fluids which are usually elevated in temperature, e.g., steam.

BACKGROUND OF THE INVENTION

Various configurations are known for restraining the movement of ruptured pipes. One known restraint has sought to restrain the movement of a ruptured pipe by utilizing a honeycomb panel which crushes on impact to absorb the energy of the pipe. Although this known construction provides satisfactory pipe restraint for preventing damage to equipment, it does not provide sufficient flexibility for totally omnidirectional application, is quite difficult to install, and is quite expensive to manufacture.

Another known pipe restraint has been used as an omni-directional restraint. This restraint includes a body or saddle member which is positioned below the high energy pipe and includes an arch affixed to the saddle and which extends around the pipe. The saddle is seated on a honeycomb panel and is affixed to the concrete or structural steel by specially formed studs. The studs deform plastically to absorb energy during upward and lateral impacts by the high energy pipe and the honeycomb panel deforms plastically to absorb energy during downward and lateral impacts by the high energy pipe.

However, with this known omni-directional restraint any upward force must be absorbed almost entirely by the specially formed studs and the downward force almost entirely by the specially formed honeycomb panel which are connected by a complex steel structure thus increasing the cost thereof.

Other known pipe restraint configurations generally include one or more of the energy absorbing components of the aforementioned known restraints. A recent pipe restraint configuration employs a plurality of discrete U-shaped rods threaded into clevi adjacent the high energy pipe with bearing bands affixed to the rods for positioning between the rods and the high energy pipe.

U.S. Pat. No. 3,923,292 (Madden, Jr.) discloses another form of an energy absorbing device, specifically for use in automobile bumpers, aircraft landing gear, auto steering columns, and elevator safety decelerators, and which includes hollow spheres for absorbing energy from a plunger as the spheres undergo plastic deformation.

It is an object of the present invention to provide improved impact energy absorbing pipe restraints, which restraints are readily usable to restrain the movement of a ruptured pipe in any direction.

It is another object of the present invention to provide improved impact energy absorbing pipe restraints at greatly reduced cost.

It is a still further object of the present invention to provide improved impact energy absorbing restraints which minimize the loads transmitted to the restraint attachment structures.

It is a still further object of the present invention to provide improved impact energy absorbing laminated strap pipe restraints in which bending effects, which contribute very little to energy absorption and subtract from allowable strain, are minimized.

It is a still further object of the present invention to provide improved impact energy absorbing pipe restraints which are readily adaptable to high energy pipes having different energy levels.

It is a still further object of the present invention to provide improved impact energy absorbing pipe restraints which will act to reduce the lateral oscillation of a ruptured pipe.

Other objects, aspects and advantages of the present invention will be apparent from the detailed description and the accompanying drawings.

SUMMARY OF THE INVENTION

Briefly, one embodiment of an impact energy absorbing pipe restraint in accordance with the present invention includes a laminated strap formed of strips of a material having the property of substantial elongation in the plastic state for absorbing the impact energy of a ruptured high energy pipe in at least one direction, the laminated strap being shaped to extend circumferentially around at least a portion of the high energy pipe with an arcuate portion formed therein which is positioned adjacent the high energy pipe and spaced therefrom to restrain movement of the ruptured pipe in the direction of the arcuate portion, and anchoring means coupled to the ends of the strap for anchoring the laminated strap to supporting structures.

As used herein, the term laminated strap shall mean a plurality of strips or laminae affixed at each end to a plate or block but not bonded to each other over a substantial portion of their length.

Another embodiment of the impact energy absorbing pipe restraint in accordance with the present invention includes a restraining pipe positioned adjacent the high energy pipe and arranged transversely to the longitudinal axis thereof, so that upon impact of the ruptured high energy pipe with the restraining pipe, the restraining pipe is crushed undergoing plastic deformation and absorbing the energy of the high energy pipe and forming in effect a well therein which aids in restricting the lateral movement of the ruptured high energy pipe.

The preferred embodiments of the present invention are illustrated in the accompanying drawings. However, it should be understood that the present invention should not be construed to be limited solely to the illustrated embodiments.

DETAILED DESCRIPTION OF THE INVENTION

Figure 1:
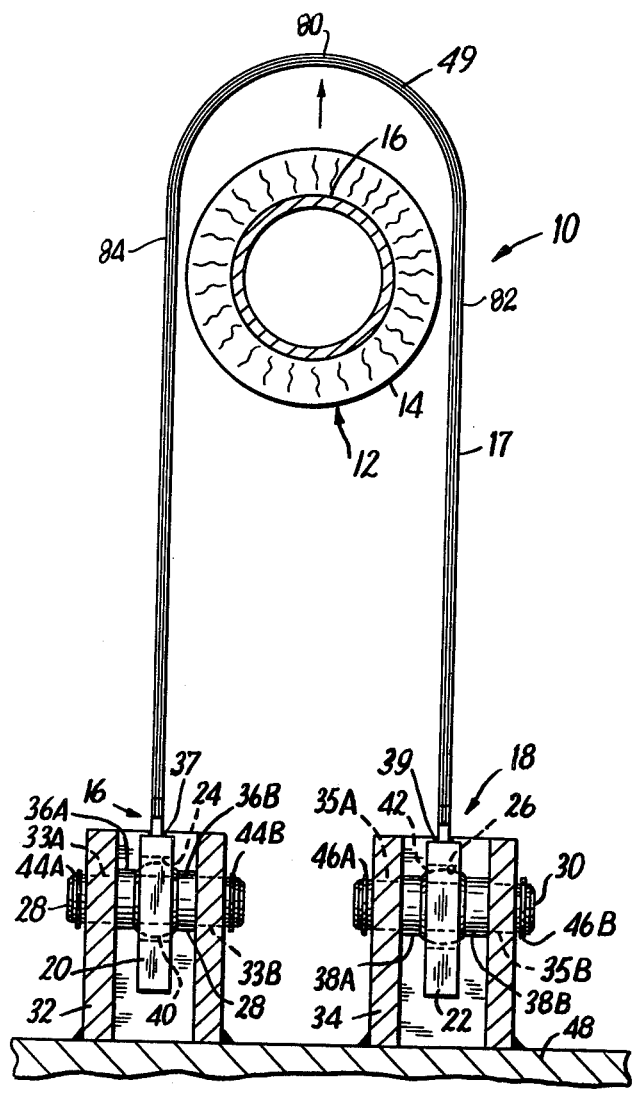
FIG. 1 is a partial cross-sectional view of an impact energy absorbing pipe restraint in accordance with the present invention taken along line 1—1 of FIG. 2.

Referring to FIG. 1, one form of an impact energy absorbing pipe restraint in accordance with the present invention is shown generally as 10 installed adjacent a high energy pipe 12. Generally, the high energy pipe 12 includes an outer concentric heat insulating covering 14 which surrounds an inner stainless steel pipe 16 which transmits the high energy fluid. However, it should be understood that the pipe 12 may or may not include such a covering, as desired. Such a pipe restraint 10 is particularly useful for absorbing the impact energy of high energy pipes of the type employed in nuclear power plants, which high energy pipes carry pressurized fluid.

The pipe restraint 10 includes a laminated strap 17 composed of a plurality of strips of a ductile material, i.e., one having the property of substantial elongation in the plastic state, preferably an annealed stainless steel known generally as type 304. This property of the material making up the laminated strap 17 is essential to provide the requisite energy absorbing capability of the laminated strap 17. Moreover, by forming the strap 17 of individual laminae or strips the energy absorbing capability of the strap is substantially increased since the plastic deformation thereof takes place under membrane action (tension) thereby substantially eliminating any bending strains.

The individual strips or laminae of the laminated strap 17 are formed into the desired restraining configuration, e.g., a U-shape is shown in FIG. 1, and held, e.g., by support clamps, while their ends 16 and 18 are affixed to the tops of a pair of plates or blocks 20 and 22, respectively, preferably by welding with a tungsten arc welder. The specific number of strips used in the laminated strap 17, as well as the width of the laminated strap 17 will vary in accordance wth the amount of impact energy to be absorbed. Preferably, the number of strips or laminae in the laminated strap 17 will vary from between about 2 to about 100. Moreover, the width of the strips or laminae is preferably between about 0.5 inches to about 15 inches.

The plates 20 and 22 are formed advantageously of annealed type 304 stainless steel also and have pin (or bolt) holes 24 and 26, respectively. The pin holes 24 and 26 are adapted to receive pins 28 and 30, respectively, which have their ends pivotally mounted to a pair of rectangularly shaped shackles or clevi 32 and 34. The clevi 32 and 34 includes holes 33A and B, and 35A and B, for rotatively receiving the pins 28 and 30, respectively. Optionally, each clevis may be reinforced by end plates attached thereto.

Preferably, retainer rings 44A and B, and 46A and B are mounted about the ends of the pins 28 and 30 which extend outwardly from the clevi 32 and 34 to prevent the pins 28 and 30 from dislodging from the clevi 32 and 34. Alternatively, bolts (not shown) having threaded ends for coupling to a pair of nuts may be substituted for the pins 28 and 30 and their retainer rings 44A and B, and 46A and B, respectively.

Preferably, prior to mounting the pins 28 and 30 thereon, the clevi 32 and 34 are anchored to a convenient support structure 48.

It is generally advantageous in the case for restraints for lines up to about 12 inches in diameter to employ spherical bearings 40 and 42 which are press-fitted into the holes 24 and 26 and mounted on pins 28 and 30 whereas in the case of larger lines such use is less desirable. The use of these spherical bearings allows additionally pivotal motion of the blocks 20 and 22 in a direction normal to the axes of the pins 28 and 30. When spherical bearings are so used, it is preferable to install bushings 36A and 36B and 38A and B, which are conveniently formed from steel tubes, for centrally spacing the plates 20 and 22 on the pins 28 and 30 relative to the sidewalls of the clevi 32 and 34, and thus preventing movement of the plates 20 and 22 along the pins 28 and 30 toward the sidewalls of the clevi 32 and 34. One end of the bushings 36A and 36B abuts against the inner sidewalls of clevis 32 and the other end of bushings 36A and 36B abuts against spherical bearing 40. In a like manner one end of bushings 38A and 38B abuts against the inner sidewalls of clevis 34 and the other end of bushings 38A and 38A abuts against spherical bearing 42.

In an alternative embodiment the clevi 32 and 34 are rotated 90° so that the axes of pins 28 and 30 which pass through the holes in the clevi are parallel to that of the pipe 12. In this case holes 24 and 26 in blocks 20 and 22 are at 90° rotation to those in the embodiment previously described.

Advantageously, the relatively narrow width of the laminated strap 17, as opposed to the substantial width of the arch used in prior known pipe restraints, coupled with the self balancing pivoting pins 28 and 30, minimizes the differential strain across the width of the laminated strap resulting from oblique pipe impacts which cause initial contact of the high energy pipe 12 with one end of the interior of the laminated strap 17. Moreover, as previously mentioned the utilization of a plurality of strips or laminae enables the impact energy to be absorbed by membrane action (tension), thereby minimizing bending effects which subtract from the allowed strain.

As shown in FIG. 1, laminated strap 17 has a U-shaped configuration having an arcuate portion 49, which reaches an apex 80, and leg portions 82 and 84. The arcuate portion 49 of the U is positioned adjacent to and held spaced from high energy pipe 12 to restrain the upward movement during rupture of the pipe, see the direction of the arrow. Advantageously, such spacing of laminated strap 17 and pivotal movement thereof relative to its clevi 32 and 34 ensures that during nonrupture periods thermal and seismic displacements of high energy pipe 12 are not inadvertently restricted. Moreover, the strap laminations of the instant invention assure a flexibility thus permitting close transverse spacing between laminated strap 17 and high energy pipe 12 without imposing inadvertent restriction of the normal pipe motion. The close transverse spacing reduces the distance the ruptured pipe can travel before being restrained; this reduces the force imposed on supporting structure 48 to which the restraining device is attached. For example, it has been found in practice that as determined by the geometry of the piping system, the spacing distance between apex 80 of laminated strap 17 and the insulating covering 14 around high energy pipe 12 is about 4 inches while the shortest distance between legs 82 and 84 of laminated strap 17 and the insulating covering 14 around high energy pipe 12 is in the range of from about 1/16 to about ½ inch.

Figure 2:
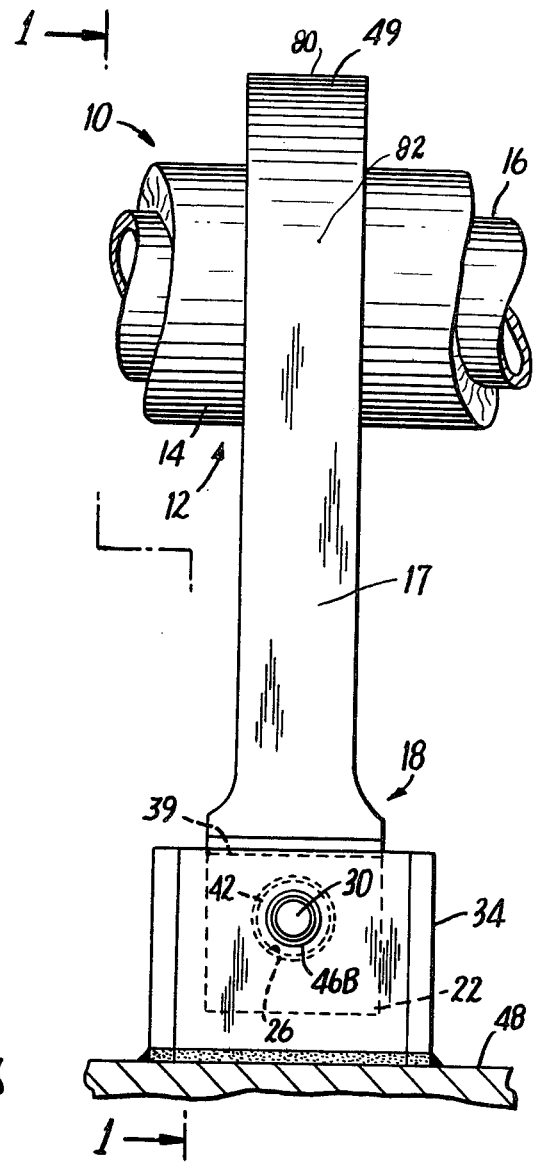
FIG. 2 is a side elevational view of the restraint shown in FIG. 1.
Figure 3:
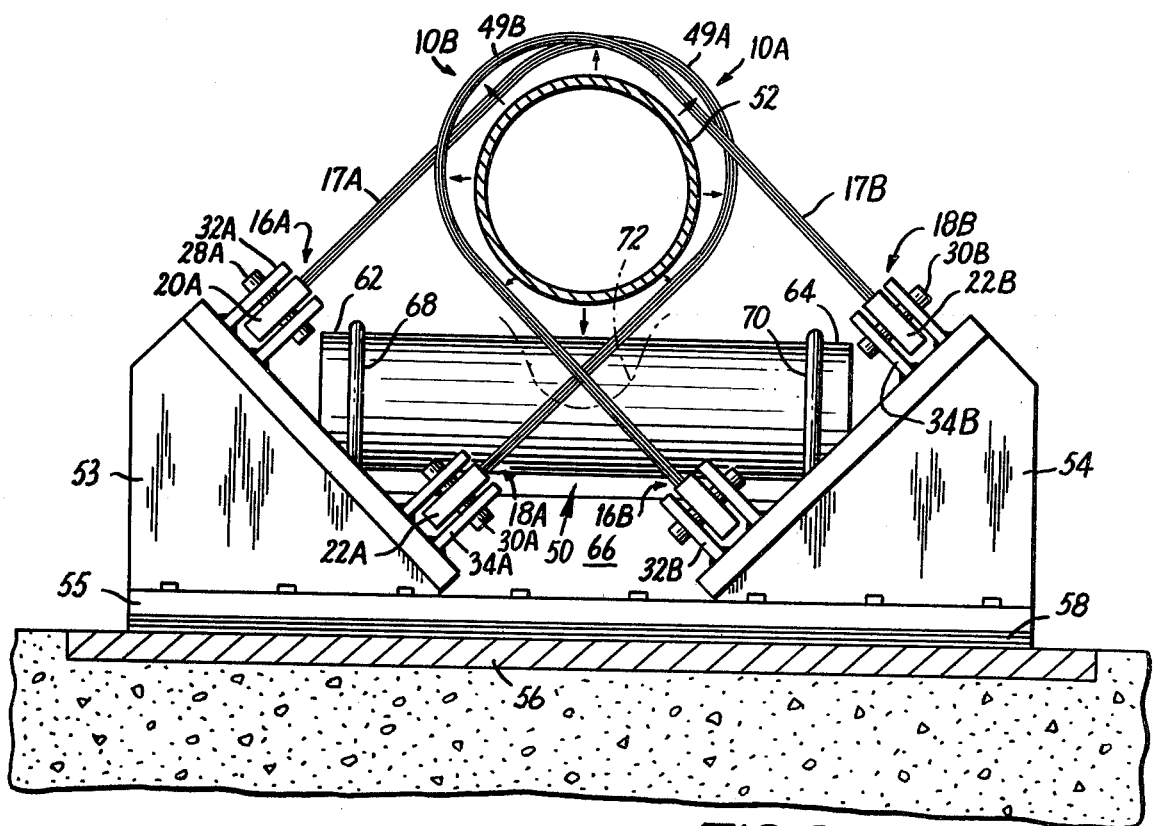
FIG. 3 is a front elevational view of one arrangement for an omni-directional pipe restraint in accordance with the present invention.
Figure 4:
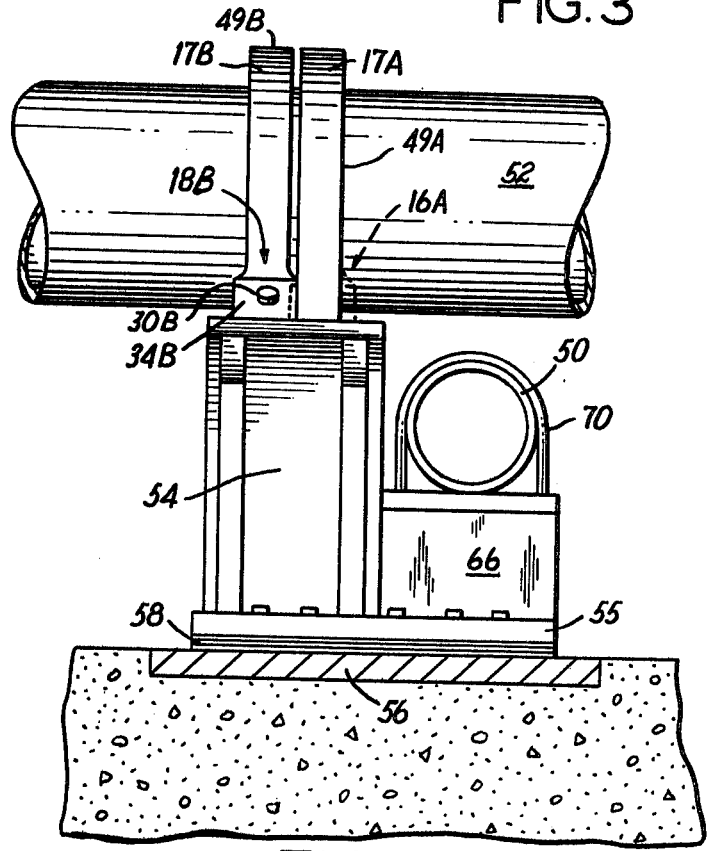
FIG. 4 is an end elevational view of the arrangement shown in FIG. 3.

It should be expressly understood that the arcuate portion 49 can be arranged to restrain movement of the high energy pipe 12 in any direction and that more than one laminated strap 17 may be employed to provide omni-directional restraint, see FIGS. 3 and 4. Moreover, preferably the ends 16 and 18 of the strap 17 are affixed to separate plates which are anchored to two clevi as shown in FIGS. 1 and 2; however, the ends 16 and 18 may be affixed to a single plate which is anchored to a single clevis, if so desired.

It has been found particularly advantageous to weld the ends of the strap to plates 20 and 22. To accomplish this, the ends 16 and 18 of the laminated strap 17 are flared so that the ends 16 and 18 are wider than the body of the strap 17. The wider ends 16 and 18 ensure sufficient strength to form the weldments 37 and 39 between the ends 16 and 18 and the plates 20 and 22, respectively, to prevent failure thereof and further enable the deformation of the weldments 37 and 39 to be either elastic or at the most slightly plastic. It has been found that such conditions exist when the width of the ends 16 and 18 of the laminated strap 17 are 1.5 times the width of the body of the laminated strap 17. Thus, under impact, the entire laminated strap 17 deforms plastically and the weldments 37 and 39 are slightly plastic. Advantageously, the substantial portion of the weldments 37 and 39, and the pivotal anchoring components are in the elastic state, thereby eliminating the necessity of exercising strict quality control over the anchoring components which would be required if the anchoring components provided a rigid affixing to the laminated strap 17.

It should be expressly understood that in FIGS. 3, 4, 5 and 6 like parts are provided with like reference characters. However, in FIGS. 3, 4, 5 and 6 letters are used to distinguish the elements in the respective figures. For example, the pipe restraint referred to as 10 in FIGS. 1 and 2 is identified by reference characters 10A, 10B and 10C in FIGS. 3, 4, 5 and 6.

Referring to FIG. 3, a pair of pipe restraints 10A and 10B of the type shown in FIGS. 1 and 2 is shown in use with a restraining pipe 50 for providing an omnidirectional restraint. The pipe restraints 10A and 10B are comprised of laminated straps 17A and 17B having arcuate portions 49A and 49B, respectively. The restraining straps 17A and 17B are oriented at angles of approximately 45° to and on opposite sides of the transverse axis of a high energy pipe 52 to restrain upward and lateral movement of the high energy pipe 52 upon rupture and the restraining pipe 50 is positioned below the high energy pipe 52 to restrain downward movement of the high energy pipe upon rupture. Thus, an omni-directional restraint is provided.

The ends 16A and 18A, and 16B and 18B of the laminated straps 17A and 17B are anchored elastically to clevi 32A and 34A, and 32B and 34B in a manner similar to that shown in FIGS. 1 and 2. However, preferably the clevi 32A and 34A and 32B and 34B are then welded to pedestal attachments 53 and 54, respectively, which are integrally formed with a pedestal support plate 55 and bolted to an embodiment plate 56 which is embedded in the concrete floor, or welded to a shield wall or the like, as desired. Additionally, clevi 32A and 34A and 32B and 34B may include flanges (not shown) for bolting directly to the concrete floor. Advantageously, shims 58 may be positioned below the pedestal support plate 55 for adjusting the position of the laminated straps 17A and 17B and the restraining pipe 50 relative to the high energy pipe 52.

The two strap arrangement and restraining pipe 50 as shown in FIGS. 3 and 4 provides adequate pipe restraint over a 360° circle around the high energy pipe 52. However, it should be understood that the omni-directional restraint may be composed entirely of straps, if so desired.

However, in providing an omni-directional pipe restraint, it has been found to be particularly advantageous to utilize the restraining pipe 50 to absorb the impact energy of a downwardly moving ruptured high energy pipe 52. Moreover, when desired, the restraining pipe 50 may be used alone or with other pipe sections to restrain the movement of a ruptured high energy pipe in any direction; however, it is particularly useful for restraining movement of the high energy pipe 52 in the downward direction.

The restraining pipe 50, which may be of carbon steel or stainless steel may be made of one or more straight or curvilinear sections, and generally has a diameter of between about 1.5 inches and 36 inches, depending on the diameter of the high energy pipe 52 and the energy level therein, and is generally positioned between about 0.25 inches to about 5 inches from the high energy pipe 52. Preferably, the ends 62 and 64 of the restraining pipe 50 are free and the restraining pipe 50 is hollow so that the impact energy of the high energy pipe 52 is absorbed by crushing of the restraining pipe 50.

In order to minimize deformation of high energy pipe 52 and to direct energy absorption primarily to restraining pipe 50, the wall thickness of restraining pipe 50 should be less than about 90% of the wall thickness of high energy pipe 52. Moreover, it is preferred that the wall thickness of restraining pipe 50 should be greater than about 0.1 inches. It has also been found that the proper selection of pipe diameter ratios further aids in minimizing deformation of high energy pipe 52 and in directing energy absorption primarily to restraining pipe 50. Preferably, the ratio of the diameter of high energy pipe 52 to the diameter of restraining pipe 50 should be in the range from about 3:1 to 1:3. Merely by way of illustration, a restraining pipe greater than 20 inches in length, having a 10 inch diameter and a wall thickness of 0.593 inches, can be utilized in the instant invention to restrain a high energy pipe having a diameter of from 3.3 to 30 inches and a wall thickness of 0.659 inches.

The restraining pipe 50 is anchored to a pedestal support 66, see also FIG. 4, at points intermediate its free ends 62 and 64 with U-bolts 68 and 70 which allow the ends to lift freely. Other means of attachment, e.g., through-bolts or welding at one or more points are possible. The pedestal support 66 is affixed to the pedestal support plates 55, e.g, by welding, and bolted to the embedment plate 56.

Advantageously, with this arrangement, during impact with the high energy 52, the free ends 62 and 64 move upwardly approximately about 5° to about 30°, relative to the longitudinal axis of the restraining pipe 50, so that while the restraining pipe 50 is being crushed a U-shaped well 72 is formed in the restraining pipe 50, see the dotted outline of the restraining pipe 50 in FIG. 3. Preferably, the length of restraining pipe 50 should be from about two to five times its diameter so that upon impact, well 72 partially surrounds ruptured high energy pipe 52 and further aids in restraining its lateral movement.

Figure 5:
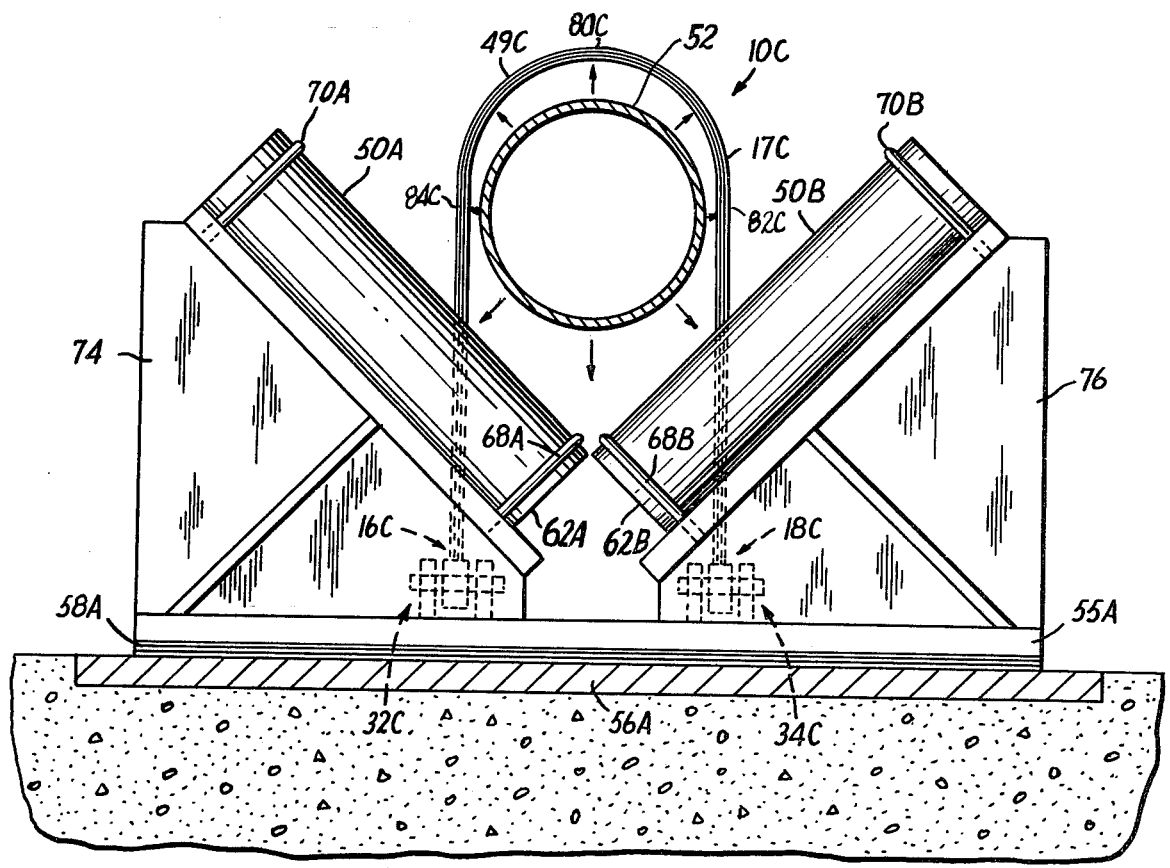
FIG. 5 is a front elevational view of another arrangement for an omni-directional pipe restraint in accordance with the present invention.
Figure 6:
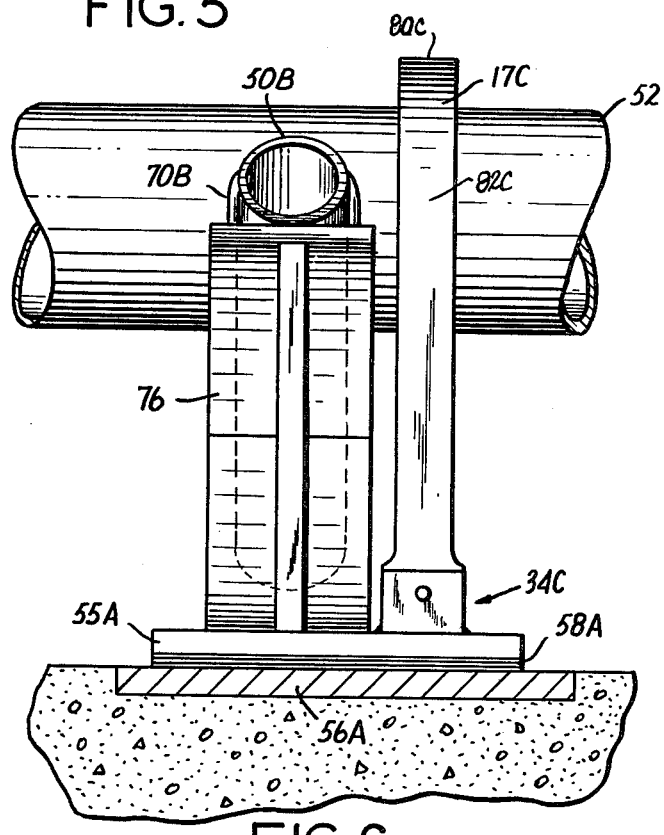
FIG. 6 is an end elevational view of the arrangement shown in FIG. 5.

Referring to FIG. 5 another form of omni-directional pipe restraint is illustrated. A single pipe restraint 10C having a laminated strap 17C for restraining upward movement is shown in use with a pair of restraining pipes 50A and B which have their ends 62A and 62B cut normal to their axes. The right angle restraining pipes 50A and 50B are positioned below the high energy pipe 52 in line with the transverse axis thereof to in effect form a V for restraining lateral and downward movement of the ruptured high energy pipe 52.

The laminated strap is operably connected to clevi 32C and 34C as previously described with respect to FIG. 1. The clevi 32C and 34C are integrally formed with a pedestal support plate 55A. The pipes 50A and 50B are coupled to pedestal supports 74 and 76, see also FIG. 6, with U-bolts 68A and 70A and 68B and 70B or other means of attachment as heretofore described. The pedestal support plate 55A is bolted to an embedment plate 56A which is embedded in the concrete floor or welded to a steel structure, as desired. Advantageously, shims 58A may be positioned below the pedestal for adjusting the position of the laminated strap 17C and restraining pipes 50A and 50B relative to the high energy pipe 52.

In operation, the pipe restraint 10 shown in FIGS. 1 and 2 absorbs the impact energy of the high energy pipe 12 when it moves upwardly and impacts the arcuate portion 49 of the laminated strap 17. The strap 17 deforms plastically while undergoing substantial elongation and utilizes its laminated construction to maximize tension on the ruptured pipe 12. Thus, the ruptured pipe 12 is prevented from moving upward and damaging equipment in that area.

This same objective of restraining movement of a ruptured pipe is accomplished with the omni-directional pipe restraints of FIGS. 3 and 4, and 5 and 6, respectively. In FIGS. 3 and 4, lateral or upward movement of the ruptured high energy pipe 52 is restrained by the laminated straps 17A and 17B and downward movement of the ruptured pipe 52 is restrained by the transversely arranged restraining pipe 50 which absorbs the impact energy of the ruptured high energy pipe 52 through crushing and advantageously forms a well 72 which aids in restraining the lateral movement of the ruptured high energy pipe 52. However, in FIGS. 5 and 6 the lateral and downward movement of the ruptured high energy pipe 52 is restrained by the restraining pipes 50A and 50B which are arranged at right angles to each other, and the upward movement of the high energy pipe 52 is restrained by the laminated strap 17C.

It should be understood by those skilled in the art that various modifications may be made in the present invention without departing from the spirit and scope thereof, as described in the specification and defined in the appended claims.

What is claimed is:

1. A pipe restraint for absorbing the impact energy of a ruptured high energy pipe and restraining movement thereof in at least one direction, comprising:
a laminated strap formed of a plurality of laminae of a material having the property of substantial elongation in the plastic state for absorbing the impact energy of a ruptured high energy pipe in at least one direction, said laminated strap being shaped to extend circumferentially around at least a portion of the high energy pipe with an arcuate portion formed therein positioned adjacent the high energy pipe and spaced therefrom to restrain movement of the ruptured high energy pipe in the direction of said arcuate portion;
anchoring means coupled to the ends of said laminated strap for anchoring said laminated strap to supporting structure; and
a restraining pipe positioned adjacent the high energy pipe and spaced therefrom, said restraining pipe being arranged substantially transversely to the longitudinal axis of the high energy pipe for restraining the movement of the ruptured high energy pipe in a direction different from that of said laminated strap.

2. The pipe restraint recited in claim 1, including:
support means for supporting said restraining pipe;
coupling means for coupling said restraining pipe to said support means intermediate its ends; and
the ends of said restraining pipe being free to move slightly upwardly as said restraining pipe is being crushed under the impact energy of the ruptured high energy pipe to form a well which aids in preventing lateral movement of the high energy pipe relative to said restraining pipe.

3. The pipe restraint recited in claim 1 wherein said laminated strap has a U-shaped configuration.

4. The pipe restraint of claim 3 wherein said high energy pipe has an insulating covering.

5. The pipe restraint of claim 4 wherein the shortest distance between each leg of said U-shaped strap and said insulating covering is in the range of from about 1/16 to about ½ inch.

6. A pipe restraint for absorbing the impact energy of a ruptured high energy pipe and restraining movement thereof in at least one direction, comprising:
a restraining pipe positioned adjacent the high energy pipe and arranged transversely to the longitudinal axis of the high energy pipe to absorb the impact energy of the ruptured high energy pipe and restrain its movement upon encountering and crushing said restraining pipe;
support means for supporting said restraining pipe adjacent the high energy pipe;
coupling means for coupling said restraining pipe to said support means;
a pair of laminated straps each formed of a plurality of laminae of a material having the property of substantial elongation in the plastic state for absorbing the impact energy of a ruptured high energy pipe, said laminated straps being generally U-shaped and extending circumferentially around approximately 180° of the high energy pipe while being spaced therefrom, each of said laminated straps being arranged at approximately a 45° angle and on opposite sides of the transverse axis of the high energy pipe to restrain movement of the ruptured high energy pipe in the upward and lateral directions;
anchoring means coupled to the ends of said laminated straps for anchoring said laminated straps about the high energy pipe; and
said restraining pipe being positioned below said high energy pipe to restrain the downward movement thereof during rupture to provide an omni-directional restraint for the high energy pipe.

7. A pipe restraint for absorbing the impact energy of a ruptured high energy pipe and restraining movement thereof in at least one direction, comprising:

a first restraining pipe positioned adjacent the high energy pipe and arranged transversely to the longitudinal axis of the high energy pipe to absorb the impact energy of the ruptured high energy pipe and restrain its movement upon encountering and crushing said first restraining pipe;

a second restraining pipe arranged generally at a right angle to said first restraining pipe, said first and second restraining pipes being symmetrically arranged below the high energy pipe in a V-shaped orientation for crushing in response to impact with the ruptured high energy pipe and thereby absorbing the impact energy of the high energy pipe to restrain downward and lateral movement of the high energy pipe;

support means for supporting said restraining pipes below the high energy pipe;

coupling means for coupling said restraining pipes to said support means;

a laminated strap formed of a plurality of laminae of a material having the property of substantial elongation in the plastic state for absorbing the impact energy of a ruptured high energy pipe in one direction, said laminated strap being shaped to extend circumferentially around a portion of the high energy pipe and having an arcuate portion formed therein extending around the upper portion of the high energy pipe and spaced therefrom to restrain upward movement of the ruptured high energy pipe;

anchoring means coupled to the ends of said laminated strap for anchoring said laminated strap about the high energy pipe; and said restraining pipes and laminated strap providing an omni-directional restraint for the high energy pipe.

* * * * *